Patented May 2, 1933

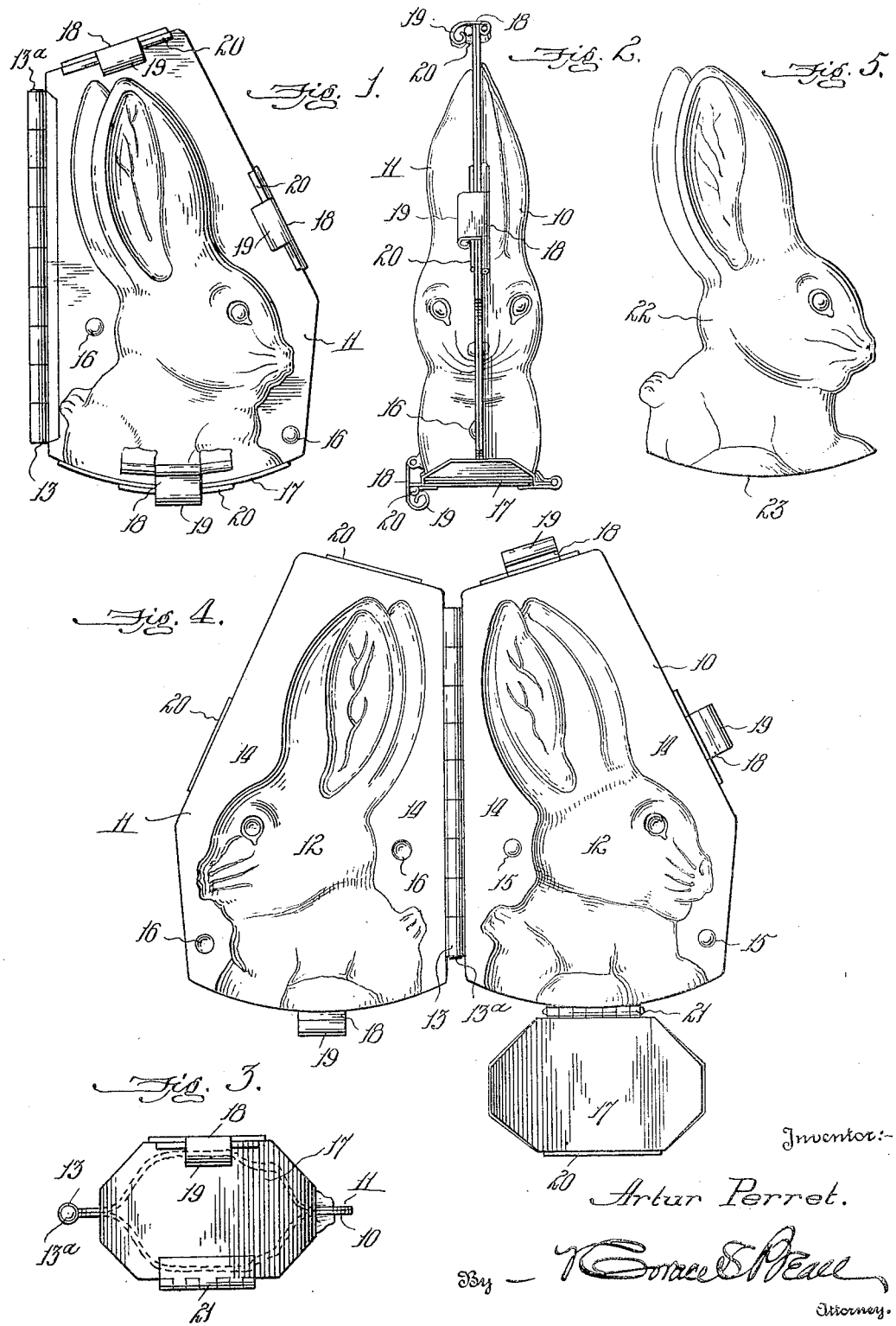

1,906,882

UNITED STATES PATENT OFFICE

ARTUR PERRET, OF NEW YORK, N. Y.

MOLD FOR FORMING CHOCOLATE ARTICLES

Application filed July 26, 1932. Serial No. 624,798.

This invention relates to portable molds for forming articles made of confection, such as chocolate, and is more especially an improvement in that general class of devices of this kind which are constructed of several hingedly connected sections to facilitate the removal of the molded article, the mold of the type embodying my improvements being usually made up of two sections with hinged lids forming the bottom of the mold and the several parts clamped together by spring catches.

The main object of my invention is to so construct the hinged sections of the mold that the meeting marginal faces will be more securely clamped together by an arrangement of the spring catches to cooperate with the hinge connecting the sections together, and in the present instance also the construction at the open end of the mold including the lid is such that the molded article will have a curved bottom permitting of a rocking motion.

With this principal object in view my invention contemplates the provision of a mold for making confections in which the device is constructed of two parts or sections hinged together at one of the longitudinal edges of the mold so as to be closed one against the other with the intermediate portions of the sections depressed from the inner side thereof to provide the shape of article desired, said depressions being extended to form the open end of the mold as well as the bottom of the molded article, and this end of the mold shaped to receive a longitudinally curved plate or lid closing the aforesaid opening; all as hereinafter fully described and specifically set forth in the appended claim.

In the drawing:

Figure 1 is a side elevation of a mold constructed in accordance with my invention.

Fig. 2 is a front elevation.

Fig. 3 is a bottom plan view.

Fig. 4 is an elevation showing the mold sections in open position looking at the inner side thereof, and Fig. 5 is a view showing the article produced by the mold.

My improvements are applied to that particular type of mold devices consisting of two hingedly connected sections 10 and 11 having mold cavities 12, 12 at the inner sides thereof which register when the sections are closed together, the cavities or depressions extending to one end of the mold to provide the opening through which material is poured into the mold, in the present instance the sections being connected by a long hinge 13 at one of the longitudinal edges of the mold and extending from one end to the other, the hinge connection being such that when the sections are brought together the inner marginal faces 14, 14 beyond the mold cavities or depressions will be in intimate contact. To insure registration of the mold cavities when the sections are brought together I provide interengaging means, as studs 15 and corresponding recesses 16, struck from the respective sections, and for securely clamping the sections together I employ a well known form of spring catch at the top and intermediate portion of the outer edge of the mold to cooperate with a similar catch for locking the lid or bottom plate 17 hereinafter particularly described. The catch consists of a metal piece 18 hinged to one of the sections and having a curved outer end or resilient bill 19 adapted to spring over a short metal strip or rod 20 welded to the companion section of the mold.

As will be noted by reference to the drawing the mold cavities extend to the lower end of the sections to provide a wide opening, as indicated in dotted lines Fig. 3, through which the material is poured into the mold, and as a further improvement in this type of mold devices the lower edges of the sections 10, 11, forming the opposite sides of said opening, are curved longitudinally to cooperate with the lid or bottom plate 17 which is correspondingly curved to form a curved bottom on the molded article. This lid or bottom plate is connected to one of the mold sections by an offset hinge 21 with the short strip or metal rod 20 of the locking means or catch at the outer edge thereof to be engaged by the metal piece 18 hinged to the other mold section, it being noted that the inner face of this plate is smooth to form a smooth bottom on the molded article and that the curvature of the plate will determine the arc of the curved bottom on said article, an example of which is shown in Fig. 5. It will be further noted that the curved lid or bottom plate is larger than the opening so as to overlap the edges of said opening, and that when the lid is closed it is in intimate engagement with these edges to properly shape the lower end of the molded article.

For the purpose of illustration the mold cavities are designed to produce the bunny rabbit 22 shown in Fig. 5, having a curved bottom 23 permitting a rocking motion, but of course any other shape may be given to the mold cavities according to whatever design of article is desired, or several articles produced by a single mold, the particular construction of the mold in addition to forming a curved bottom on the molded article providing a device of this general character in which the sections are firmly clamped together to prevent waste of material by leakage between the sections as well as insure a clean cut article. Furthermore, the specific construction herein shown and described provides a substantially built mold that may be employed in molding articles made of confection as well as of any other material, as for instance plaster of Paris, etc.

I claim:—

A mold device comprising two sections, a hinge connecting the said sections at one of the longitudinal edges of the mold and extending the full length thereof, said sections having mold cavities opening out at one end of the mold and the edges of the sections at the opposite sides of said opening curved longitudinally, a correspondingly curved lid or bottom plate closing said opening and adapted to form a curved bottom on the molded article, and spring catches for securely clamping the sections and lid together, said catches being located at the top, bottom, and intermediate portion of the longitudinal edge of the mold opposite the hinge.

ARTUR PERRET.